A. DAVIS.
Animal Traps.
No. 154,376.  Patented Aug. 25, 1874.
FIG. I.
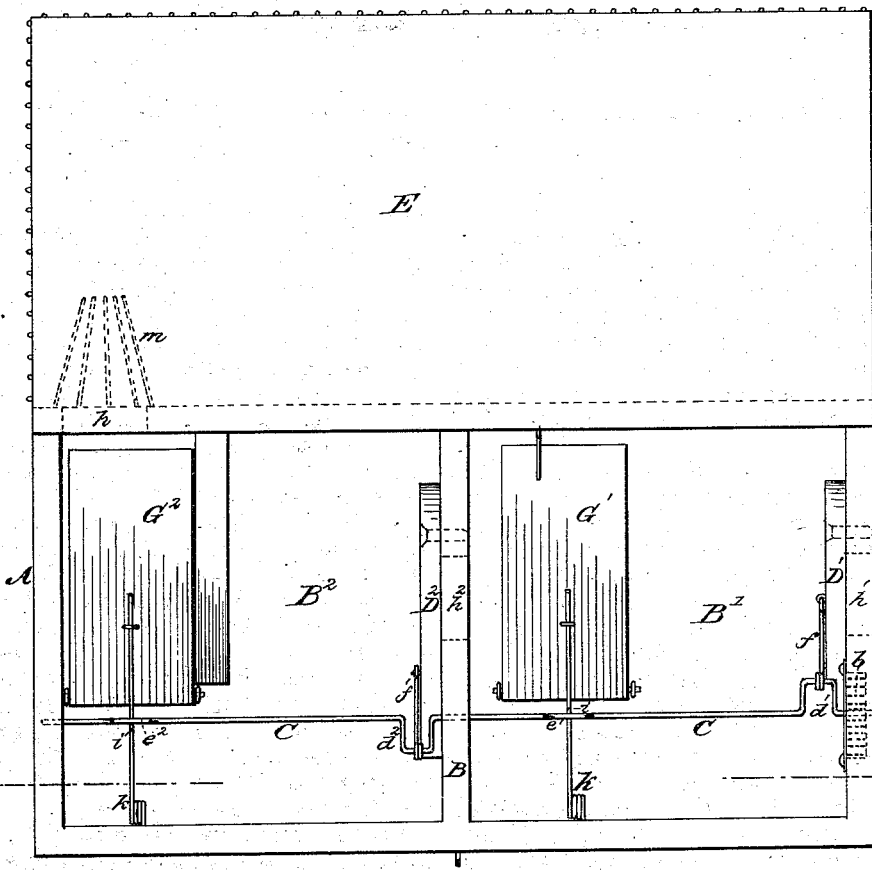
FIG. II.
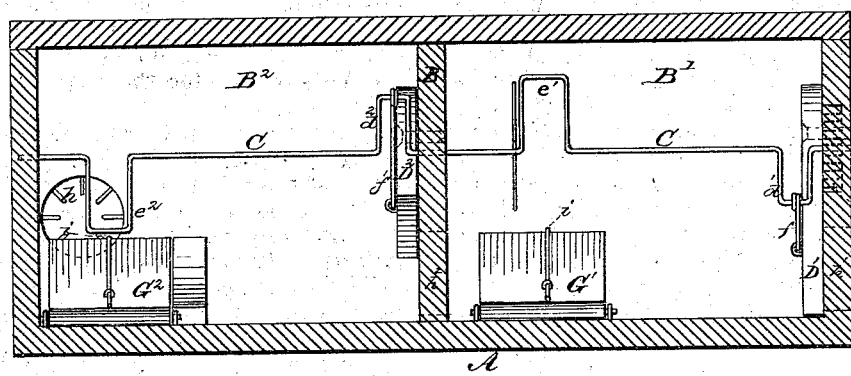
WITNESSES:
H. K. DuHamel
Thomas Byrne
INVENTOR:
Albert Davis
Per H. S. Abbot
Attorney

UNITED STATES PATENT OFFICE.

ALBERT DAVIS, OF FOREST CITY, MISSOURI.

IMPROVEMENT IN ANIMAL-TRAPS.

Specification forming part of Letters Patent No. 154,376, dated August 25, 1874; application filed July 27, 1874.

*To all whom it may concern:*

Be it known that I, ALBERT DAVIS, of Forest City, county of Holt and State of Missouri, have invented certain new and useful Improvements in Self-Setting Animal-Traps, of which the following is a specification:

The nature of my invention consists in the construction and arrangement of a self-setting animal-trap, as will be hereinafter more fully set forth.

In order to enable others skilled in the art to which my invention appertains to make and use the same, I will now proceed to describe its construction and operation, referring to the annexed drawings, in which—

Figure 1 is a plan view of the entire trap with the top removed. Fig. 2 is a longitudinal section of the same through a line in front of and parallel with the operating crank-shaft, showing said shaft and its cranks.

A represents a box, of any suitable dimensions, divided by a central transverse partition, B, into two compartments, $B^1$ and $B^2$. Longitudinally through the box A passes a shaft, C, provided with a crank or lever, $a$, on one end, for turning the same and winding up a coil-spring, $b$, placed around said shaft in a recess in one of the sides of the box. Within the compartment $B^1$ the shaft C is provided with two cranks, $d^1$ and $e^1$, and within the compartment $B^2$ it has corresponding cranks $d^2$ and $e^2$. The corresponding cranks in the two compartments extend in opposite directions, as shown in Fig. 2. The crank $d^1$ is, by a rod, $f$, connected with a pivoted door, $D^1$, to open and close the entrance $h^1$ to the compartment $B^1$. The crank $d^2$ is, by a similar rod, connected with a pivoted door, $D^2$, to open and close the passage $h^2$ from the compartment $B^1$ to $B^2$, said passage being in the partition B. In the apartment $B^1$ is a treadle, $G^1$, situated near the passage $h^2$, and held in an inclined position by a spring-arm, $k$, upon which is bend or offset $i$. In the apartment $B^2$ is a similar treadle, $G^2$, with spring-arm $k$ and offset $i$. The treadle $G^2$ is situated near a passage, $h$, leading from said apartment to a cage, E, of any suitable construction. Within this cage, around the opening $h$, is a wire fender, $m$, to allow the animal to pass into the cage, but prevent its egress therefrom.

In winding up the spring $b$ the cranks $e^1$ $e^2$ come in contact with the offsets or bends $i$ on the spring-arms $k$, which act as ratchets, to prevent the unwinding of the spring.

When setting the trap the door $D^1$ should be open, and the door $D^2$ closed.

The animal enters through the passage $h^1$, and, in going around in the compartment $B^1$, steps upon the treadle $G^1$, releasing the crank $e^1$, so that the shaft C can make one-half of a revolution, it being stopped by the crank $e^2$. This movement closes the door $D^1$, and opens the door $D^2$, so that the animal will pass into the apartment $B^2$, and here, attracted by the light from the cage, will step on the treadle $G^2$, thereby again causing one-half of a revolution of the shaft C. This movement reverses the position of the doors, again setting the trap for the next animal. The animal in the apartment $B^2$ will pass into the cage E, from whence it cannot return.

Having thus fully described my invention, what I claim as new, and desire to secure by Letters Patent, is—

1. In combination with the trap A, having compartments $B^1$ $B^2$ and pivoted doors $D^1$ $D^2$, the shaft C, provided with spring $b$ and the cranks $d^1$ $d^2$, connected with the doors, substantially as and for the purposes herein set forth.

2. The combination, with the shaft C and spring $b$, of the treadles $G^1$ $G^2$, spring-arms $k$ $k$, and offsets $i$ $i$ thereon, substantially as and for the purposes herein set forth.

3. The combination of the box A with compartments $B^1$ $B^2$, crank-shaft C, spring $b$, doors $D^1$ $D^2$, treadles $G^1$ $G^2$, and cage E, all substantially as and for the purposes herein set forth.

In testimony that I claim the foregoing as my invention I hereunto affix my signature this 23d day of July, 1874.

ALBERT DAVIS.

Witnesses:
ORVEL GRAVES,
OLIVER C. PLUMMER.